UNITED STATES PATENT OFFICE.

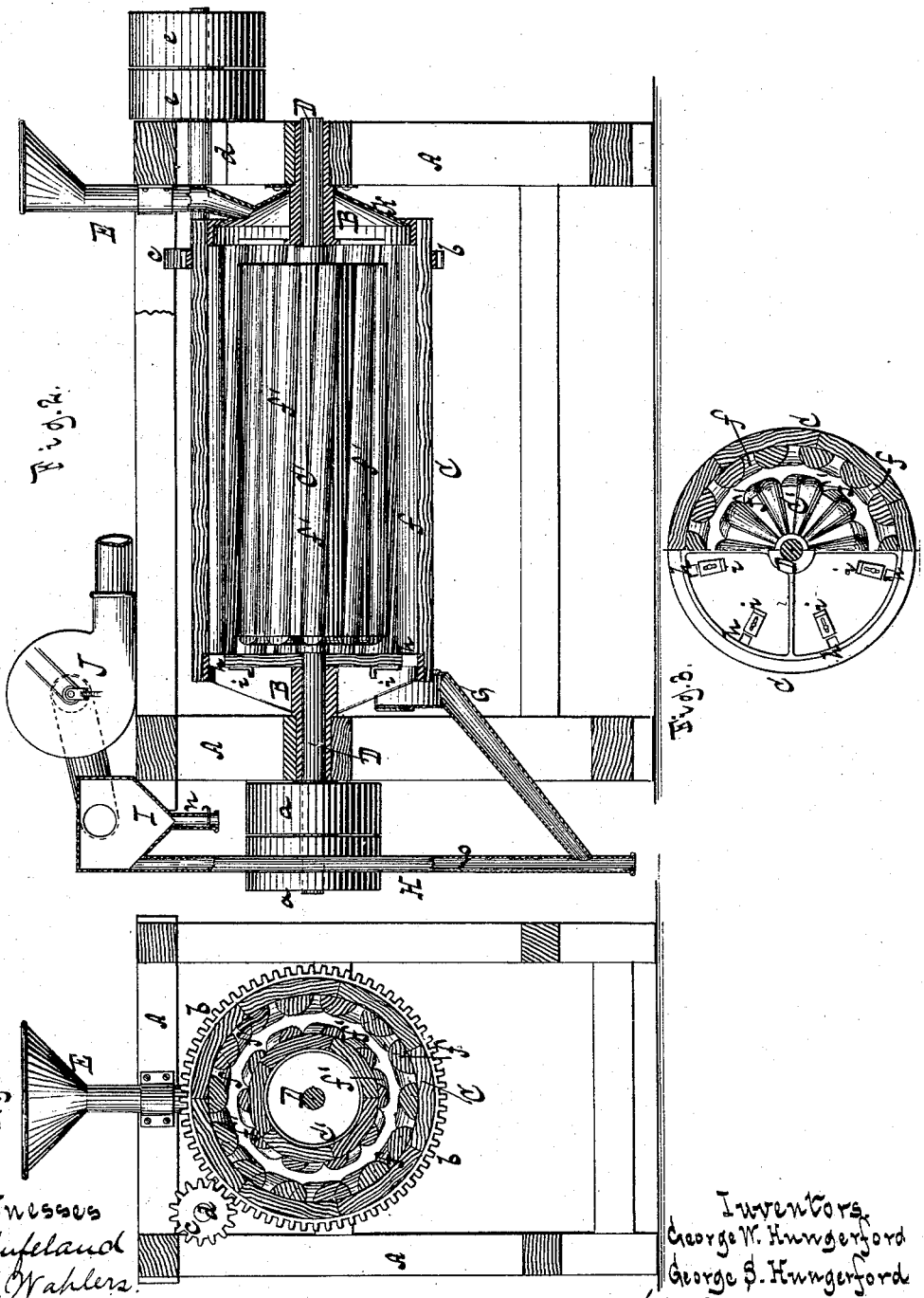

GEORGE W. HUNGERFORD AND GEORGE S. HUNGERFORD, OF NEW YORK, N. Y.

MACHINE FOR CLEANING, SCOURING, AND POLISHING COFFEE, &c.

SPECIFICATION forming part of Letters Patent No. 232,504, dated September 21, 1880.

Application filed June 3, 1880. (No model.)

*To all whom it may concern:*

Be it known that we, GEORGE W. HUNGERFORD and GEORGE S. HUNGERFORD, both citizens of the United States, residing at New York, in the county and State of New York, have invented new and useful Improvements in Machines for Cleaning, Scouring, and Polishing Coffee, Grain, and other Similar Materials, of which the following is a specification.

This invention relates to the method of scouring coffee or other grain, and also to the construction of machines for that purpose.

The machine used in carrying out our invention is illustrated in the accompanying drawings, in which—

Figure 1 represents a vertical longitudinal section. Fig. 2 is a vertical cross-section. Fig. 3 shows the outer scouring-cylinder, partly in end view and partly in section, a portion of the inner cylinder being also thus exposed to view.

Similar letters indicate corresponding parts.

The letter A designates the machine-frame, forming the bearings for gudgeons B B, projecting from the opposite ends of a cylinder, C, within which is situated a second cylinder, C'. If desired, this inner cylinder, C', may be made solid, and it is mounted on a shaft, D, which extends through the gudgeons B B, (the latter being to this end made hollow,) and which carries pulleys a.

To a suitable part of the outer cylinder, C, is applied a toothed ring, b, into which meshes a pinion, c, mounted on a shaft, d, which carries pulleys e.

In practice the pulleys a and e are connected with driving mediums in such a manner that the cylinders C C' revolve in opposite directions. Both the cylinders C C' are constructed with a series of ribs, $f f'$, which are on the opposed surfaces of the cylinders—that is to say, the ribs $f$ are on the inner surface of the outer cylinder, while the ribs $f'$ are on the outer surface of the inner cylinder. These ribs $f f'$ are set obliquely to the axes of the cylinders C C', but the ribs of one cylinder extend in a different direction from those of the other cylinder, and by this arrangement thereof the ribs act on the coffee or other grain introduced to the outer cylinder, as hereinafter explained, with a tendency to throw the same in opposite directions.

At one end of the outer cylinder, C, is a hopper, E, for introducing the coffee or other grain into such cylinder, while in the opposite end thereof are a series of discharge-ports, $h$, having gates $i$ for closing the same. The hopper E is connected to a fixed head, $k$, projecting into the outer cylinder, C, but without interfering with the revolutions of this cylinder.

At the discharge or delivery end of the outer cylinder, C, and below such cylinder, is a chute, G, which is fastened to the machine-frame, and is connected to a suction-flue, H, leading to a chamber, I, to which is connected an exhaust-fan J, or any other suitable air-exhaust device. From the suction-chamber I projects a spout, $n$, having a suitable gate, and in the pipe H is arranged a damper, $o$.

In carrying out our invention we open the discharge-ports $h$, start the cylinders C C', and feed the coffee or other grain to be scoured to the outer cylinder without intermission. In this manner the grain is caused to pass through the cylinder C in a continuous stream, and the same being therein subjected to the scouring action of the ribs $f f'$ it emerges therefrom through the ports $h$ in a cleaned and polished state.

In the scouring-machines now generally used the grain is introduced and permitted to discharge intermittingly. This method involves considerable waste of time, which is saved by our invention. The rapidity with which the grain discharges from the cylinder C can be regulated by a suitable adjustment of the gates $i$ of the discharge-ports.

In order to facilitate the scouring operation a suitable quantity of sand or grit is mixed with the grain introduced into the cylinder C, and as the whole discharges from such cylinder it is caught on the chute G, whereby it is conducted to the suction-flue H. A partial vacuum is maintained in this flue by the action of the fan J, and by this means the grain and the sand or grit are separated from each other — that is to say, the grain is permitted to escape at the lower end of the flue, while the sand or grit rises therein and is carried off by the fan, the dirt removed from the grain being also thus carried off. Any light or defective particles that may be contained in the mass of grain flowing into the suction-flue H are carried up with the sand or grit and are deposited in the chamber I, whence they may be discharged at pleasure.

A solution of gum-arabic, turmeric, and soapstone may be applied to coffee as it passes into the polisher, where it is necessary to get proper color and gloss.

What we claim as new, and desire to secure by Letters Patent, is—

1. In a machine for scouring coffee or other grain, the combination of two cylinders, arranged one within the other, to revolve in opposite directions, and constructed with oblique ribs $f\ f'$ on their opposed surfaces, extending from end to end of the cylinders, the ribs of one cylinder extending in a different direction from those of the other cylinder, substantially as shown, the whole adapted to operate substantially as described.

2. In a machine for scouring coffee or other grain, the combination of two cylinders, arranged one within the other, to revolve in opposite directions, and constructed with oblique ribs on their opposed surfaces, a hopper for introducing the grain into the outer cylinder at one end thereof, and a series of discharge-ports having adjustable gates $i$ in the opposite end of such cylinder, the whole adapted to operate substantially as described.

In testimony whereof we have hereunto set our hands and seals in the presence of two subscribing witnesses.

GEORGE W. HUNGERFORD. [L. S.]
GEORGE S. HUNGERFORD. [L. S.]

Witnesses:
W. HAUFF,
E. F. KASTENHUBER.